Aug. 20, 1957  T. C. DUVALL  2,803,188
PRODUCTION OF EMBOSSED POROUS COATED POROUS FIBERBOARD
Filed Sept. 28, 1954
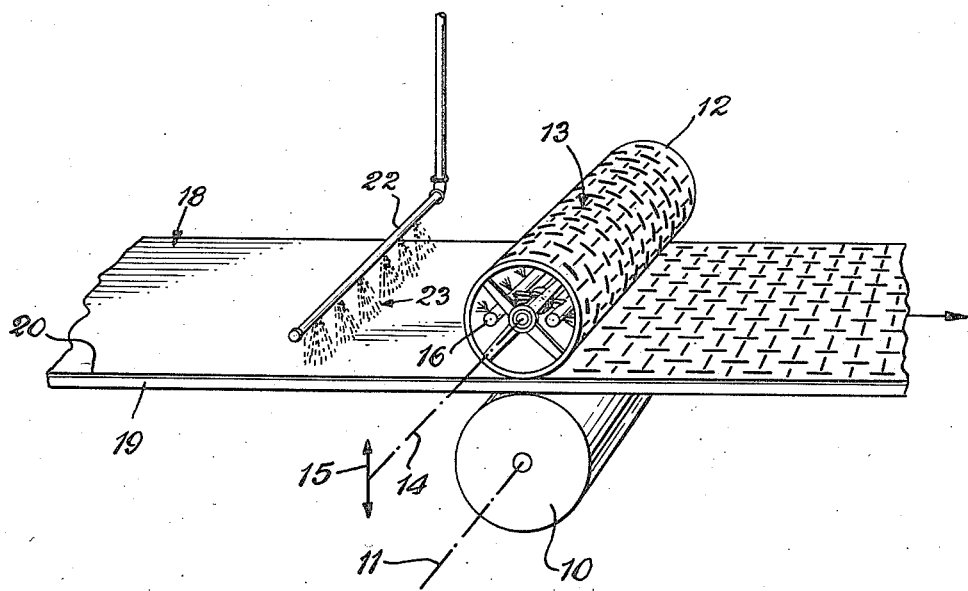
Inventor
Thure C. Duvall, deceased
by Arndt J. Duvall, Administrator
by W. Bartlett Jones,
Attorney

United States Patent Office 2,803,188
Patented Aug. 20, 1957

2,803,188

PRODUCTION OF EMBOSSED POROUS COATED POROUS FIBERBOARD

Thure C. Duvall, deceased, late of Cloquet, Minn., by Arndt J. Duvall, administrator, St. Paul, Minn., assignor to Wood Conversion Company, St. Paul, Minn., a corporation of Delaware Application September 28, 1954, Serial No. 458,876

5 Claims. (Cl. 101—32)

The present invention relates to the production of embossed coated fiberboard of cellulosic fibers, and more particularly to enhancing the decorative character of coated board by embossing the coated board.

Rigid insulation board of cellulosic fibers is well known, varying in density within the range from 10 to 30 pounds per cubic foot, and being commonly of a density of approximately 17 pounds per cubic foot. So constituted, such board has porosity which contributes to its insulating value. Being porous, it is compressible. Some such boards are formed with a smooth ironed or calendered face and others are rough textured for decorative effect. The non-smooth ones are frequently made with or without coatings so as to exhibit the fibrous texture thereof.

It has long been a practice to merchandise such board material with decorative coatings thereon in large sheets or in special sizes such as boardlike lengths, commonly called plank, or smaller squares or rectangles, commonly called tile. Because cellulosic fibers discolor on exposure to light and air, the fibers are hidden by pigment in an applied coating composition, chosen for its permanence of color for decorative effect.

It is the general object of the present invention to enhance the decorative character of such boards, plank and tile which already are provided with a decorative coat, by embossing.

It is a particular object of the invention to facilitate the process of embossing coated fiberboard of the character described.

Various other and ancillary objects and advantages of the invention will become apparent from the following description and explanation of the invention, which is given in connection with the accompanying drawing showing suitable apparatus for the process.

In coating porous fiberboard, it is possible to apply coating materials in such a way that the surface fibers are coated sufficiently to mask and cover the cellulosic material, without sealing the pores into the body of the board. Such practice is set forth in the U. S. Patents Nos. 2,409,638, 2,409,629 and 2,409,630, all referring to coating of wet board-forming mats. However, the coating process is also conducted on dry board material to provide covered fibers and also porosity in the coat. The present invention is concerned with such coated porous-bodied boards having pores through the surface coat into the board. The pores in the surface vary in size, sometimes being visible to the naked eye and sometimes being microscopic. On non-smooth boards, there results a decorative coat having a characteristic texture when the coat is not a continuous impervious film, even though it may have continuity over the coated face from fiber to fiber around the pores.

Coating materials vary over a wide range of composition. Commonly, they have a high ratio of pigment particles to volatile liquid vehicle. The pigment is for hiding power and a bonding material for the pigment is carried by liquid which is preferably water. The bonding material is dissolved or dispersed and may be protein, synthetic resin, rubber solids, solids of synthetic latices, linseed oil and other drying oils and drying compositions. Such bonding material is more commonly employed not as a vehicle for pigment, but more sparsely as a bonding agent from pigment particle to pigment particle upon loss of the volatile liquid vehicle. For effecting porosity in the coat, the coating composition includes a volatile liquid vehicle to effect full coverage of fibers and of the board face, so that on loss of the volatile vehicle the pores previously sealed by the liquid reappear as the solid content of the coating composition shrinks onto the fibers. Another mechanism for assuring the existence of pores is to place a limited quantity of the liquid coating composition onto the surface of the board while the board is under compression, as by passing under a roll, so that on expansion of the board leaving the roll, liquid is sucked into the surface layer, the surface fibers are coated, and the pores immediately reappear.

The preferred binders are those which may be dispersed in water as the vehicle. All such binders employed in so coating board permit the thin coats on the fibers to soften to a limited degree at temperatures upwardly from 212° F., thereby permitting the softened coats to be deformed without visible damage to the appearance of the coat. However, it has been ascertained that applying hot embossing rollers or the like to dry coated board to soften the coat and to deform it in embossing, presents certain difficulties.

Especially, attempts to roll-emboss air-dried porous coated board have shown that it may be done when using sufficient heat and pressure, but with the result that there is additional drying out of the surface fibers with embrittlement and breakage thereof. As a result, the embossed coated board is to a degree "punkier" than before embossing. Another disadvantage is the resistance of the dried fibers beneath the coat to the forces of compression necessary to effect embossing. The present invention overcomes these disadvantages.

By adding moisture to the fibers under the coating, the embrittlement is avoided, and both the temperature and the pressure may be lowered for effective embossing. By use of sufficient moisture, the fibers become plasticized under the embossing heat, yield more readily to the varying local embossing pressures, and thus permit use of less pressure and lower temperature for a given result. The effect of moisture on the coat itself is to plasticize it, especially so when it has a protein or hydrophilic colloid binder. This also permits use of lowered temperature and pressure. The present invention contemplates introducing the excess moisture as steam, either directly by action of steam on the face of the board just before embossing, or preferably by providing sufficient free water on the coated face so that the hot embossing roll generates the steam for entry through the pores immediately before the time that the steam exerts its functions to plasticize the fiber and the coat.

In practice, the board to be embossed is passed through the nip of two rolls under pressure of one roll toward the other. The rolls may be disposed in any direction, it being immaterial whether their axes are horizontal or vertical. Preferably one roll has a fixed axis and the other one a movable axis under suitable spring or controlled fluid pressure, as required. The two rolls have the same peripheral speed and are preferably of the same diameter. As illustrated in the drawing, the top roll is movable and it effects the embossing either by a design on its face or by pressing onto the board an interposed design-forming element such, for example, as a coarse-mesh wire screen. The top roll is heated, as by steam, electricity or a flame, under suitable control to maintain the desired temperature at the point of embossing. The inactive part of the roll may be hotter than the active part because of the cooling effect by contact with the cooler board and the form of water present. When the embossing roll is hollow, it may be heated from within as well as from its exterior. The cooling effect in use may be controlled by the positioning of localized heating means, as between the exterior and interior, and as to peripheral position.

Steam jets may play upon the board just as it enters the embossing region, but excess steam escaping into the atmosphere is not easily avoided. The best results have been achieved by use of a fine spray or mist of water directed onto the coat of the board at any convenient location in advance of the region of embossing. When the free water arrives at the embossing region, it is vaporized to steam, some escaping but a sufficient amount entering the pores of the coat and into the pores of the fiber body at the surface to plasticize the fibers beneath the coat, and to a depth involved in the embossing.

In the drawing, the process is shown somewhat diagrammatically without reference to mechanical structure for mounting the parts. The numeral 10 represents a bottom roll with a fixed axis 11. Above the roll 10 is an embossing roll 12 having a pattern 13 thereon. The embossing roll 12 has its axis 14 vertically movable as indicated by the arrow 15 and is under control of suitable yielding pressure means (not shown). Gas burners 16 are suitably located within the roll for heating it. Numeral 18 represents an unembossed board passing between the two rolls. The board 18 has a porous fiber body 19 and a porous coat 20 thereon, the thickness of the coat being exaggerated in the drawing.

In advance of the embossing roll 12 is located a suitable spraying device 22 for directing a spray or mist of water 23 onto the coat 20. When the water strikes the heated roll 12, it is vaporized to steam and the steam enters the pores of the coat 20 and the surface layer of the fiber body 19 beneath the coat. Under the influence of heat from the roll 12, and of the resulting steam, the coat is plasticized at the same time that the fibers beneath the coat are plasticized by the steam which has entered. Some of this steam will also have condensed and wetted the fibers to enhance the plasticity. Thereby the coat and the surface layer of the fiber body yield readily to the embossing pressure and as the board leaves the roll the embossing becomes set as the plasticized materials cool. The residual heat in the face of the embossed board hastens the loss of residual moisture and return to moisture-equilibrium with the atmosphere.

The following description illustrates the conditions applicable to a coated insulation board having a density of 17 pounds per cu. ft., and coated while in the condition of a wet board-forming mat with the following coating composition:

| | |
|---|---|
| Water _____ lbs__ | 80 |
| Prussian Blue pigment _____ grams__ | 319 |
| Methocel (4000 cps.) _____ do____ | 140 |
| Sodium triphosphate _____ do____ | 480 |
| Chrome yellow _____ do____ | 2508 |
| Black iron oxide pigment _____ do____ | 1634 |
| Lithopone _____ lbs__ | 11.25 |
| Titanium-oxide-calcium sulphate _____ lbs__ | 11.25 |
| Clay _____ lbs__ | 50 |
| Diatomaceous earth _____ lbs__ | 18 |
| Casein _____ lbs__ | 6 |
| Nonionic surfactant (Triton X-100) _____ grams__ | 400 |
| Latex dispersion—50% solid content of copolymers of vinylidene chloride and vinyl chloride __lbs__ | 61.75 |

The above composition is applied to a wet board-forming mat in the amount of 33 lbs. per M sq. ft., and dried in an oven having a temperature in the range from 250° F. to 360° F. The coating is green and porous, tough, washable, and scuff-resistant. At temperatures upwardly from about 300° F., the coating softens and deforms without visible crackling so that under the influence of heat from the embossing roll it yields to conform to the embossing pattern. On leaving the roll, it again hardens to recover its normal properties described above.

The temperature and heat capacity of the embossing roll need be such that the coating is still plastic as the embossed coat leaves the embossing roll. The character of the coat and the cooling effect of the added water or steam to the coat, predetermine the heated character of the embossing roll.

From the foregoing, it will be appreciated that the invention can be carried out in a variety of ways so long as the hot compression of the coating takes place while the underlying layer of the fiber contains sufficient moisture to plasticize the fibers for yielding in position to the pattern of the embossing. The plasticizing of the fibers not only preserves strength in the felted layer compared to loss of strength in crumbling of embrittled fibers, but also the embossing may be effected at lower temperatures than would prevail if the additional moisture were not present. Other methods of practicing the invention are contemplated within the scope of the appended claims.

I claim:

1. The method of embossing an air-dry rigid porous cellulosic fiberboard having a porous pigmented fiber-hiding coat thereon which coat provides access to the pores of the board, which comprises subjecting the porous coated face to steam for penetration of steam through the coat to the fibers under the coat, and subjecting the steam-treated face to mechanical embossing pressure by application of a heated design-forming member at a temperature above 212° F., and thereafter cooling the resulting embossed board.

2. The method of embossing by rolling pressure of a roll over an air-dry rigid porous cellulosic fiberboard having a porous pigmented fiber-hiding coat thereon which coat provides access to the pores of the board, which comprises relatively moving the roll under embossing pressure and at a temperature above 212° F. over the coated face of the board, and at least just prior to contact of the roll with each particular area of the board effecting the presence of a form of water on the face of the board at said area for forcing steam into the pores of the coat to the fibers beneath the coat.

3. The method of embossing by rolling pressure of a roll over an air-dry rigid porous cellulosic fiberboard having a porous pigmented fiber-hiding coat thereon which coat provides access to the pores of the board, which comprises relatively moving the roll under embossing pressure and at a temperature above 212° F. over the coated face of the board, and at least just prior to contact of the roll with each particular area of the board, wetting the coat at said area with water for generating steam by said roll for entry through the pores of the coat to the fibers beneath the coat.

4. The method of embossing an air-dry rigid porous cellulosic fiberboard having a porous pigmented fiber-hiding coat thereon which is plastic at a temperature above 212° F., which comprises applying rolling embossing pressure at a temperature above 212° F. to said coat in the presence of a form of water in excess of the air-dry content on and under said coat and in the layer of fibers adjacent said coat.

5. The method of embossing an air-dry rigid porous cellulosic fiberboard having a porous pigmented fiber-hiding coat thereon which is plastic at a temperature above 212° F., which comprises wetting said coat with water, and applying rolling embossing pressure at a temperature above 212° F. to said water-wet coat, whereby to generate steam for passage through the pores of the coat and for plasticizing the layer of fibers directly beneath said coat, whereby said plasticized fibers and coat readily yield to the pattern of the embossing pressure.

References Cited in the file of this patent

UNITED STATES PATENTS

| | | |
|---|---|---|
| 1,231,697 | Brown | July 3, 1917 |
| 1,471,906 | Longren | Oct. 23, 1923 |
| 1,674,848 | Webb | June 26, 1928 |
| 1,939,081 | Prager | Dec. 12, 1933 |
| 2,016,568 | Zinser | Oct. 8, 1935 |
| 2,414,177 | Smith | Jan. 14, 1947 |
| 2,442,598 | Harrison | June 1, 1948 |
| 2,551,005 | Johnson | May 1, 1951 |